United States Patent
Hitz et al.

(10) Patent No.: US 10,305,151 B2
(45) Date of Patent: May 28, 2019

(54) BATTERY CARRIER FOR AN ELECTRIC MOTOR VEHICLE WITH A COOLING SYSTEM

(71) Applicant: Benteler Automobiltechnik GmbH, Paderborn (DE)

(72) Inventors: Andreas Hitz, Erwitte (DE); Christian Handing, Langenberg (DE); Thomas Olfermann, Salzkotten (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 15/844,058

(22) Filed: Dec. 15, 2017

(65) Prior Publication Data

US 2018/0183116 A1    Jun. 28, 2018

(30) Foreign Application Priority Data

Dec. 22, 2016 (DE) .................. 10 2016 125 476

(51) Int. Cl.
| | |
|---|---|
| *B60K 1/04* | (2019.01) |
| *H01M 10/625* | (2014.01) |
| *H01M 10/613* | (2014.01) |
| *B60R 16/04* | (2006.01) |
| *H01M 10/6554* | (2014.01) |
| *H01M 2/10* | (2006.01) |
| *H01M 10/6556* | (2014.01) |

(52) U.S. Cl.
CPC .......... *H01M 10/625* (2015.04); *B60R 16/04* (2013.01); *H01M 2/1077* (2013.01); *H01M 10/613* (2015.04); *H01M 10/6554* (2015.04); *H01M 10/6556* (2015.04); *H01M 2220/20* (2013.01)

(58) Field of Classification Search
CPC ............. H01M 10/50; H01M 10/6556; H01M 10/625; H01M 10/61; H01M 10/62; H01M 10/64; B60R 16/04
See application file for complete search history.

(56) References Cited

U.S. PATENT DOCUMENTS

| | | | | |
|---|---|---|---|---|
| 7,206,202 | B2 * | 4/2007 | Yang ...................... | H01L 23/467 165/80.2 |
| 2003/0017384 | A1 * | 1/2003 | Marukawa .......... | H01M 2/1077 429/120 |
| 2007/0231678 | A1 * | 10/2007 | Park .................... | H01M 10/625 429/62 |

(Continued)

FOREIGN PATENT DOCUMENTS

DE          102014218137 A1     3/2016

OTHER PUBLICATIONS

German Patent Application No. 10 2016 125 476.2, Office Action dated Oct. 5, 2017, 10 pp.

*Primary Examiner* — James A Shriver, II
*Assistant Examiner* — James J Triggs
(74) *Attorney, Agent, or Firm* — Hauptman Ham, LLP

(57) ABSTRACT

A battery carrier for accommodating at least one battery for an electric motor vehicle is disclosed having tension spring elements being arranged underneath a base of the battery carrier. The tension spring elements press a temperature adjustment element, which is likewise arranged underneath the base, onto the base, such that heat conduction from the base into the temperature adjustment element takes place.

15 Claims, 2 Drawing Sheets

(56) References Cited

U.S. PATENT DOCUMENTS

| | | | |
|---|---|---|---|
| 2009/0246606 A1* | 10/2009 | Shimizu | H01M 10/625 429/62 |
| 2016/0043454 A1* | 2/2016 | Shaaia | H01M 10/6557 429/120 |
| 2017/0018824 A1* | 1/2017 | Maguire | H01M 2/1077 |
| 2018/0115030 A1* | 4/2018 | Janarthanam | H01M 2/1077 |

* cited by examiner

BATTERY CARRIER FOR AN ELECTRIC MOTOR VEHICLE WITH A COOLING SYSTEM

RELATED APPLICATIONS

The present application claims the priority of German Application Number 10 2016 125 476.2, filed Dec. 22, 2016, the disclosure of which is hereby incorporated by reference herein in its entirety.

BACKGROUND

1. Field of the Invention

The disclosure is related to a battery carrier, and more specifically, to a battery carrier for accommodating at least one battery for an electric motor vehicle.

2. Description of the Related Art

Increasing electric mobility can be noted from the prior art in recent years. In this respect, electric motor vehicles are driven purely by electric means. To provide the electric energy required for this purpose, batteries, also referred to as accumulators, are known, these being arranged in particular in an underfloor region of the motor vehicle. In order that the batteries on the one hand can be mounted, but on the other hand are also arranged in a manner protected against external weathering influences during their service life, battery carriers, also referred to as battery trays, are known. These battery carriers are trough-shaped components closed, in particular, with a cover. The batteries are arranged in the inner space of the battery carriers.

During a charging operation of the batteries themselves, but also during the consumption of electric energy from the battery for driving the electric motor vehicle, generation of heat in the batteries can be noted. In order that overheating of the batteries, which is critical in certain circumstances, does not occur here, cooling systems which are used in the battery carrier are known. For the most part, a cooling medium is conducted through cooling ducts in order to thereby discharge the heat which arises in the batteries and to avoid overheating of the batteries.

DE 10 2013 225 628 A1 discloses a cooling system in which the battery is arranged inside the battery carrier and the cooling system is brought into form-fitting abutting contact with the battery. In order that this form-fitting abutting contact is provided, and as a result of this a correspondingly good conduction of heat from the battery to the cooling system is effected, spring elements are arranged in the battery carrier and exert a compressive force onto the cooling system. As a result, the cooling system is pressed onto the battery. In addition to a disadvantageous assembly, a structure of this type is rather inexpedient owing to its construction.

In plan view, the battery carriers have a planar region of between occasionally 1 and 4 m². If a compressive force is then exerted within the planar region, trough bases and/or covers of the battery carrier bulge, and in certain circumstances this can lead to leaks. DE 10 2014 218 137 A1 likewise discloses a pressing concept for cooling elements of a high-voltage battery.

SUMMARY

According to one exemplary embodiment, a coupling is provided to bring a cooling system into form-fitting abutting contact within a battery carrier, in such a manner that effective heat conduction is effected, but at the same time a favorable manufacturability of the battery carrier is made possible.

The battery carrier for accommodating at least one battery for an electric motor vehicle has a trough-like inner space with a base. The trough is preferably closed by a cover. The trough can be an assembled component or else a single-piece component produced, for example, by deep drawing. The cover in this respect can be embodied as an identical component to the trough itself, and therefore a trough-like cover is used. A substantially flat cover can also be used, however. The batteries are arranged in the battery carrier in such a manner that they are arranged in abutting contact with the base.

According to one exemplary embodiment, it is now provided that, on that side of the base which lies opposite the batteries, temperature adjustment elements are arranged in areal abutting contact with the base. This provides a corresponding possibility in particular to discharge heat of the batteries in the case of temperature adjustment elements in the form of cooling elements. It is also possible, however, for the temperature adjustment elements to be embodied as latent heat stores. Corresponding preliminary temperature adjustment of the batteries is thus likewise possible. In order that the temperature adjustment elements now remain in areal abutting contact, it is provided that a form-fitting coupling is affected. This form-fitting coupling is effected, according to the exemplary embodiment, in such a manner that extensions protruding on the base with respect to a planar region of the base are embodied as lugs. At least one spring element is coupled to the extensions, and exerts a tensile force onto the temperature adjustment elements, such that the latter are pulled or pressed onto the base.

This configuration yields significant advantages over the prior art. Integral coupling, for example by adhesive bonding, would lead to cracks and/or detachment in the region of the adhesive bond over the service life of such a battery carrier owing to the occasionally severe thermal expansion. In addition to a reduced mechanical strength, poorer heat conduction is likewise to be noted on account of air pockets in the cracks. According to the exemplary embodiment, this is avoided by the force mechanically applied by the tension spring element, and the temperature adjustment elements are tightened areally against the base constantly, with differing thermal expansion being compensated for.

The spring element is preferably a tension spring element. A further advantage is that no compressive stresses are exerted on the base in the transverse direction by the at least one tension spring element. Warping and/or deforming of the base or cover is thus likewise avoided according to the invention.

A further advantage is simple assembly. Firstly, the base can be produced, and then the temperature adjustment elements can be arranged on the base. The further assembly of the tension spring element is effected by mechanical fixing, in such a manner that drying of an adhesive bond is not required. Furthermore, the base can be assembled individually with the temperature adjustment element. Complete assembly of the battery carrier is not necessary for arranging the temperature adjustment ducts, as is the case, for example, with compression spring elements having the cover as are known from the prior art.

A further considerable advantage is that, when the battery carrier is arranged in the underfloor region of a motor vehicle, the cooling system is arranged pointing downward with respect to the motor vehicle vertical direction. On account of compression spring elements not being present, an underride guard arranged underneath the battery carrier can be arranged at a spacing from the cooling system and in particular in a manner mechanically decoupled from the cooling system. Action on the underride guard, for example undesired positioning of the motor vehicle on a curb or the like, therefore initially does not lead to such damage to the battery carrier that, for example, the cooling system springs a leak or is mechanically damaged. It is thus furthermore ensured that the cooling system remains in operation correctly and with full cooling performance, even when the electric motor vehicle is handled in an undesirably improper manner.

Preferably, the temperature adjustment elements are embodied as cooling ducts, the cooling ducts being produced from lightweight metal or plastic. In particular, the cooling ducts are embodied as cooling ducts of wide or planar cross section. To this end, use is preferably made of an extrusion method in order to produce a hollow profile. The cooling ducts are then formed in the hollow profile. A cooling medium can then be conducted through the cooling ducts.

Additionally or alternatively, it is possible for the temperature adjustment elements to be embodied as latent heat stores. By way of example, a combination of cooling elements and latent heat stores as the temperature adjustment element is conceivable.

The tension spring element is embodied in particular as a bracket component. It is very particularly preferable that the tension spring element is produced from a steel material. The tension spring element preferably engages behind an extension at each end in a form-fitting manner. A central region of the tension spring element in this case covers over the temperature adjustment element and exerts a spring force onto the temperature adjustment element, such that the temperature adjustment element is pressed onto the base.

The extensions on or in the base themselves can be produced in various ways. If the base is produced as an extruded component, the extensions can protrude with respect to the base and can be produced directly therewith; in particular, they are formed in one piece and in a materially integral manner with the base. In this case, the extensions are preferably embodied as lugs which protrude with respect to the base. The extensions may be formed over the entire length or width of the base. The extensions may also be formed only in certain portions, however.

In the case of a base produced by forming, for example as a deep-drawn component, the extensions may likewise be formed in one piece and in a materially integral manner in the base by embossing. The base is embossed in the region of the extensions in such a manner that part of the base is formed protruding with respect to the base, and thus provides the extension.

A further possibility for forming the extensions is that they are produced as an external component and are coupled to the base. By way of example, they can be adhesively bonded or welded to the base. Riveting of the extensions to the base is also conceivable.

To improve the thermal conductivity between the battery base and the base, or between the base and the temperature adjustment element, it is furthermore conceivable to provide a thermally conductive paste. The thermally conductive paste preferably has a permanently elastic form so that it compensates for thermal fluctuations between the individual components.

A further advantageous configuration variant of the present invention provides that the base itself is embodied as a hollow chamber profile in cross section. In this configuration, the base is formed in particular with an integrated underride guard. The temperature adjustment elements are then preferably arranged in turn between the actual base of the battery carrier and the underride guard in the hollow chamber. The temperature adjustment elements are coupled with the aid of the tension spring element. For production, firstly the base is produced as an extruded component. Then, the temperature adjustment elements are pushed laterally into the base. The tension spring elements are likewise pushed in, such as to produce a mechanical coupling between the temperature adjustment element and the base. The underride guard is then arranged at a spacing from the temperature adjustment elements, in particular without abutting contact and without mechanical coupling.

Moreover, it is preferable that ribs are formed on the underride guard, in particular on an inner side of the underride guard. The ribs extend in the direction of extrusion or longitudinal direction of the base. The ribs furthermore afford the advantage that the underride guard is reinforced, and also, in the event of a crash, in particular in the event of a crash from the side, additional stiffening of the motor vehicle body is provided by the battery carrier, and here in particular the underride guard.

BRIEF DESCRIPTION OF THE DRAWINGS

For an understanding of embodiments of the disclosure, reference is now made to the following description taken in conjunction with the accompanying drawings, in which.

In the figures, the same reference signs are used for identical or similar components, even if a repeated description is dispensed with for reasons of simplicity.

DETAILED DESCRIPTION OF SOME EMBODIMENTS

Some embodiments will be now described with reference to the Figures.

Figure 1:
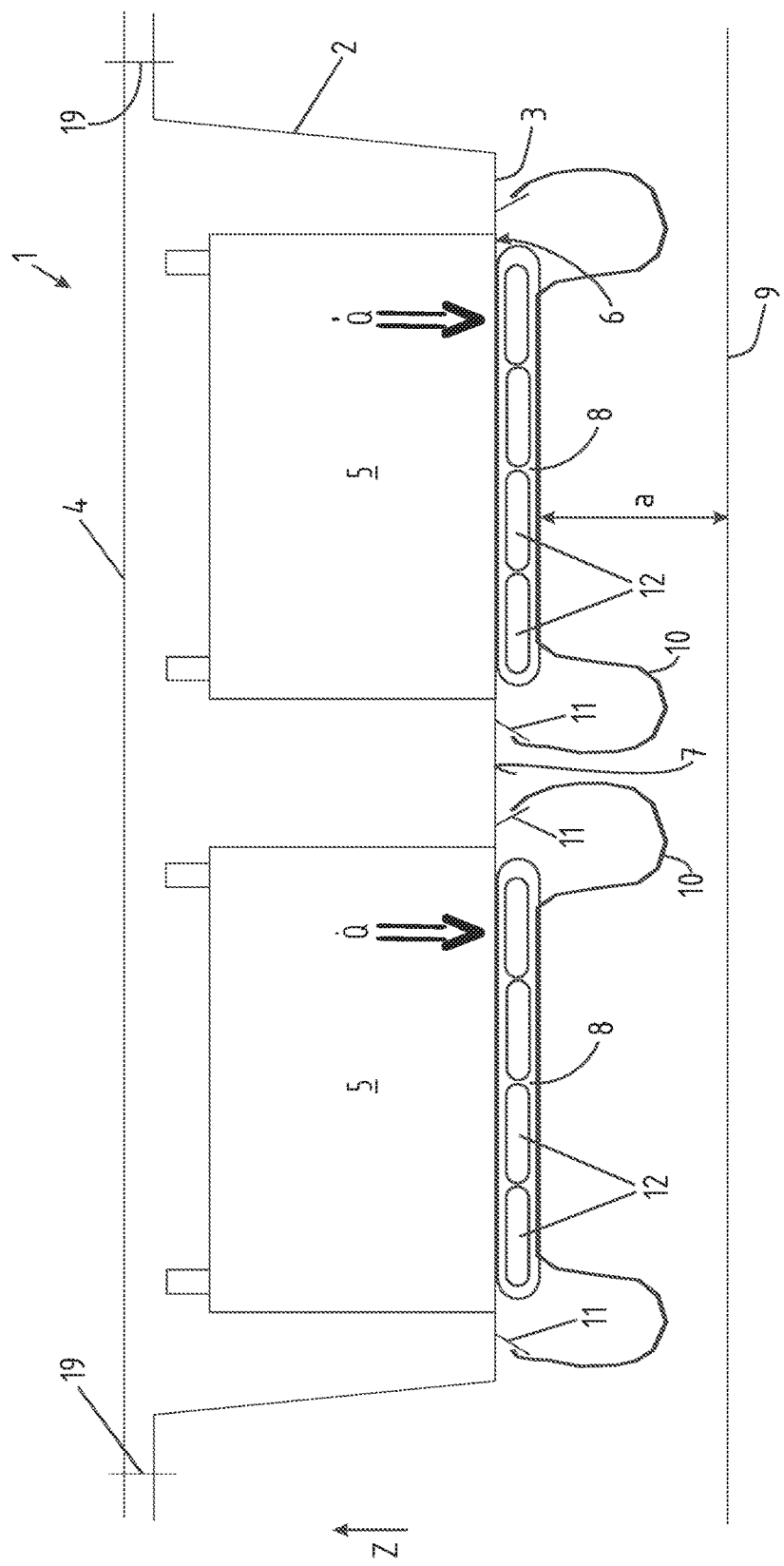
FIG. 1 is a cross sectional view of a battery carrier in accordance with an exemplary embodiment; and, FIGS. 2 to 5 are detailed cross sectional views through the base with a temperature adjustment element.

FIG. 1 shows a battery carrier 1 in a cross-sectional view. The battery carrier 1 has a trough 2 with a base 3. The trough 2 is closed or can be closed by a cover 4, for example by way of screw connections 19. Batteries 5 are arranged in the battery carrier 1. The batteries 5 stand on the base 3 of the trough 2 in a planar manner by way of the battery base 6. Heat which forms is conducted from the battery 5 via the battery base 6 into the base 3 by means of heat conduction. Temperature adjustment elements 8 are arranged on an outer side 7 of the base. An underride guard 9 is arranged underneath the temperature adjustment elements 8, at a spacing. The aforementioned directional information "top" and "bottom" refer to the motor vehicle vertical direction Z. In order that the temperature adjustment elements 8 remain arranged underneath the base 3, provision is made of tension spring elements 10, shown here in the form of bracket components.

Figure 2:
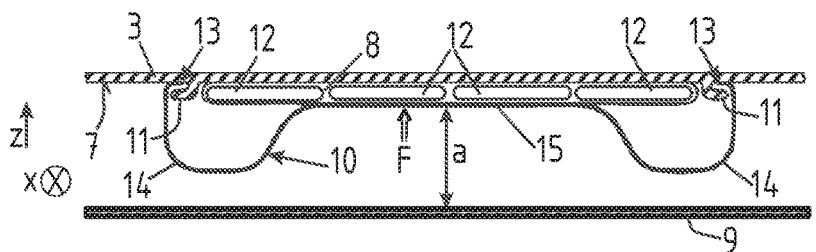

Referring to FIG. 2, the base 3 has extensions 11 which protrude with respect to the outer side 7 of the base in the form of lugs. In this configuration variant of FIG. 2, the extensions 11 are formed in one piece and in a materially integral manner, for example during extrusion. By way of example, the extensions 11 may therefore extend continuously over the entire base 3 in the motor vehicle longitudinal direction x. Cooling ducts 12 are formed in the temperature adjustment elements 8 themselves.

In this case, the temperature adjustment element 8 is likewise embodied as a planar extruded component and bears areally against the outer side 7 of the base. A tension spring element 10 in the form of a bracket component engages with each of its ends 13 into the extensions 11, and therefore presses the temperature adjustment element 8 onto the outer side 7 with a pressing force F. To this end, the tension spring element 10 has a curved portion 14 on each outer side and a pressing portion 15 which is offset inward with respect to the curved portion, such that a tensile force or clamping force is exerted onto the pressing portion 15 by pulling by the tension spring element 10 via the curved portion 14, the pressing portion 15 exerting a pressing force F onto the temperature adjustment element 8. It is therefore possible to arrange the underride guard 9 at a spacing a from the temperature adjustment elements 8. Any potential deformation of the underride guard 9 in the motor vehicle vertical direction Z by virtue of external influences thus does not act initially on the temperature adjustment elements 8 or the base 3 of the battery carrier 1. A compression spring or the like is therefore not arranged between the temperature adjustment element 8 and the underride guard 9, and therefore the underride guard 9 or base 3 do not bulge.

Figure 3:
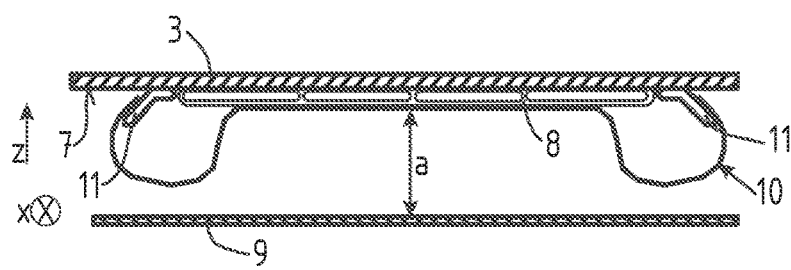

FIG. 3 depicts an alternative configuration in which the base 3 of the battery carrier 1 is not produced by extrusion, but rather for example as a pressed component, to be precise by deep drawing. The extensions 11 are externally produced components. By way of example, the extensions 11 may also be embodied as strips extending correspondingly in the motor vehicle longitudinal direction x. These can be coupled to the base 3, for example by thermal joining or else by mechanical joining. The tension spring element 10 is coupled to the extensions 11 in a manner engaging behind the latter in a form-fitting manner, such that the temperature adjustment elements 8 are pressed against an outer side 7 of the base. A corresponding underride guard 9 is therefore arranged in turn at a spacing a from the temperature adjustment elements 8.

Figure 4:
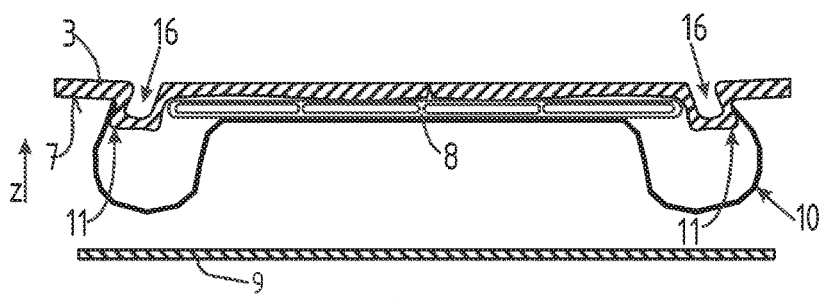

FIG. 4 depicts an alternative configuration in which the base 3 is produced again as a formed component. The base 3 has impressions 16. The impressions 16 are formed in such a manner that the impression 16 is embodied as an extension 11 protruding with respect to an outer side 7 of the base. The impressions 16 are produced in particular by forming. It is therefore possible to arrange the tension spring element 10 in a manner engaging behind the impressions 16 in a form-fitting manner, in such a manner that the temperature adjustment elements 8 are pressed areally onto the outer side 7 of the base.

Figure 5:
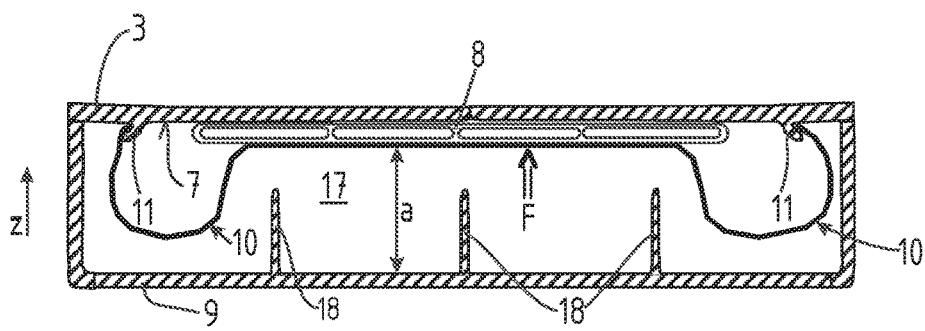

FIG. 5 depicts an alternative configuration in which the base 3 is embodied as at least one closed hollow chamber profile, in such a manner that the actual base 3 of the trough 2 and an underride guard 9 are formed so to speak. In particular, this is produced as an extruded component. The extensions 11 are therefore arranged in one piece and in a materially integral manner. The temperature adjustment elements 8 are arranged in the hollow chamber 17 which is formed as a result. The extensions 11 in turn have a tension spring element 10 engaging behind them in a form-fitting manner, and exert a pressing force F onto the temperature adjustment element 8, in such a manner that the latter is pressed against an outer side 7 of the base. Ribs 18 which additionally reinforce the underride guard 9 are optionally arranged in the hollow chamber 17. In this case, too, a corresponding spacing a is formed between the underride guard 9 and the temperature adjustment element 8, in such a manner that mechanical damage to or deformation of the underride guard 9 inward does not have a direct effect on the temperature adjustment element 8.

The foregoing description of some embodiments of the invention has been presented for purposes of illustration and description. It is not intended to be exhaustive or to limit the invention to the precise form disclosed, and modifications and variations are possible in light of the above teachings or may be acquired from practice of the invention. The specifically described embodiments explain the principles and practical applications to enable one ordinarily skilled in the art to utilize various embodiments and with various modifications as are suited to the particular use contemplated. It is intended that the scope of the invention be defined by the claims appended hereto, and their equivalents. Further, it should be understood that various changes, substitutions and alterations can be made hereto without departing from the spirit and scope of the invention as described by the appended claims.

The invention claimed is:

1. A battery carrier for accommodating at least one battery for an electric motor vehicle, comprising:
    a trough-shaped inner space having a base for accommodating batteries therewithin and arranged in abutting contact with the base;
    the base having an outer side;
    a plurality of temperature adjustment elements being arranged in areal abutting contact with the base;
    wherein extensions are embodied as protruding lugs on a planar region of the outer side of the base; and
    at least one spring element coupled to the extensions in such a manner that the temperature adjustment elements are pressed onto the base,
    wherein the temperature adjustment elements are embodied as cooling ducts, and
    wherein the cooling ducts are produced from lightweight metal or plastic.

2. The battery carrier of claim 1, wherein the temperature adjustment elements are embodied as latent heat stores.

3. The battery carrier of claim 1, wherein the spring element is a tension spring element, the tension spring element embodied as a bracket component.

4. The battery carrier of claim 3, wherein the base is produced as an extruded component, the temperature adjustment elements being arranged in a hollow chamber of the base.

5. The battery carrier of claim 1, wherein the base is a base plate.

6. The battery carrier of claim 3,
    wherein the extensions are produced in one piece and in a materially integral manner in the base, or
    wherein the extensions are as a separate component coupled to the base.

7. The battery carrier of claim 6, wherein the base is formed from light-weight metal and/or wherein a thermally conductive paste is arranged between the base and the battery base and/or between the base and the temperature adjustment elements.

8. The battery carrier of claim 7, wherein an underride guard is arranged at a spacing from the tension spring element.

9. The battery carrier of claim 1, wherein the base is a hollow component of closed cross section, a top side forming the base of the trough of the battery carrier and a bottom side forming an underride guard.

10. The battery carrier of claim 9, wherein ribs are formed on the bottom side.

11. The battery carrier of claim 1, wherein the cooling ducts are extruded components.

12. The battery carrier of claim 3, wherein the base is produced as an extruded component in cross section as a hollow component with a hollow chamber.

13. The battery carrier of claim 3, wherein the extensions are produced in one piece and in a materially integral manner in the base by embossing.

14. A battery carrier for accommodating at least one battery for an electric motor vehicle, comprising:
- a trough-shaped inner space having a base for accommodating batteries therewithin and arranged in abutting contact with the base;
- the base having an outer side;
- a plurality of temperature adjustment elements being arranged in areal abutting contact with the base;
- wherein extensions are embodied as protruding lugs on a planar region of the outer side of the base; and
- at least one spring element coupled to the extensions in such a manner that the temperature adjustment elements are pressed onto the base,
- wherein the base is a hollow component of closed cross section, a top side forming the base of the trough of the battery carrier and a bottom side forming an underride guard.

15. A battery carrier for accommodating at least one battery for an electric motor vehicle, comprising:
- a trough-shaped inner space having a base for accommodating batteries therewithin and arranged in abutting contact with the base;
- the base having an outer side;
- a plurality of temperature adjustment elements being arranged in areal abutting contact with the base;
- wherein extensions are embodied as protruding lugs on a planar region of the outer side of the base; and
- at least one spring element coupled to the extensions in such a manner that the temperature adjustment elements are pressed onto the base,
- wherein the spring element is a tension spring element, the tension spring element embodied as a bracket component, and
- wherein the extensions are produced in one piece and in a materially integral manner in the base by embossing.

* * * * *